United States Patent
Kato et al.

(10) Patent No.: US 6,486,629 B2
(45) Date of Patent: *Nov. 26, 2002

(54) METHOD FOR CONTROLLING FORCE APPLICATION WITH SERVO MOTOR AND APPARTUS THEREWITH

(75) Inventors: Tetsuaki Kato, Hadano (JP); Koichi Okanda, Oshino-mura (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 15 days.

(21) Appl. No.: 09/269,070

(22) PCT Filed: Aug. 13, 1998

(86) PCT No.: PCT/JP98/03616

§ 371 (c)(1),
(2), (4) Date: Mar. 19, 1999

(87) PCT Pub. No.: WO99/09641

PCT Pub. Date: Feb. 25, 1999

(65) Prior Publication Data

US 2001/0040439 A1 Nov. 15, 2001

(30) Foreign Application Priority Data

Aug. 13, 1997 (JP) .............................................. 9-231759

(51) Int. Cl.[7] .................................................. H02P 7/00

(52) U.S. Cl. ........................ 318/432; 318/433; 318/434; 318/568.12; 318/568.16

(58) Field of Search ............................ 318/566, 568.12, 318/568.16, 568.17, 568.18, 671, 432, 433, 434

(56) References Cited

U.S. PATENT DOCUMENTS

| | | | | |
|---|---|---|---|---|
| 4,812,722 A | * | 3/1989 | Corrothers | 318/561 |
| 5,331,264 A | * | 7/1994 | Cheng et al. | 318/568.11 |
| 5,341,078 A | * | 8/1994 | Torii et al. | 318/568.22 |
| 5,484,975 A | * | 1/1996 | Itatsu | 219/86.7 |
| 5,637,969 A | * | 6/1997 | Kato et al. | 318/432 |
| 5,734,242 A | * | 3/1998 | Iwashita | 318/434 |
| 5,834,917 A | * | 11/1998 | Yasui et al. | 318/568.11 |
| 5,869,799 A | * | 2/1999 | Arasuna et al. | 219/86.7 |
| 5,990,442 A | * | 11/1999 | Suita et al. | 219/86.25 |
| 6,096,994 A | * | 8/2000 | Handa et al. | 219/130.5 |

FOREIGN PATENT DOCUMENTS

| | | |
|---|---|---|
| JP | 59-136811 A | 8/1984 |
| JP | 60-132213 | 7/1985 |
| JP | 61-208513 A | 9/1986 |
| JP | 61-251915 A | 11/1986 |
| JP | 6-161507 | 11/1992 |
| JP | 5-116094 | 5/1993 |
| JP | 6-339292 | 9/1993 |
| JP | 07-104856 A | 4/1995 |
| JP | 07-319558 A | 12/1995 |
| JP | 08-309140 A | 11/1996 |

* cited by examiner

Primary Examiner—Robert E. Nappi
Assistant Examiner—Rina I. Duda
(74) Attorney, Agent, or Firm—Staas & Halsey LLP

(57) ABSTRACT

An applied force Td is estimated by an observer. A gain A is multiplied by a value obtained by subtracting the estimated applied force Td from commanded force Fe. From this multiplied value, a product of a speed feedback amount and a gain Kv is subtracted to obtain a torque command. With this torque command Tc, a servo motor is driven. Since a feedback control of the applied force is performed, response is fast, and an applied force between welding tips and an object to be welded can be accurately controlled. Feedback control of an applied force, whose vibration is prevented, can be performed by adjusting the gains A and Kv.

14 Claims, 3 Drawing Sheets

METHOD FOR CONTROLLING FORCE APPLICATION WITH SERVO MOTOR AND APPARTUS THEREWITH

TECHNICAL FIELD

The present invention relates to a method for controlling an applied force, which is applied by a movable object (for example, a pair of welding tips of a welding gun for a spot welding) whose driving is controlled by a servo motor, to another object, and an apparatus therewith.

BACKGROUND ART

Generally, an applied force that is applied by a movable object whose driving is controlled by a servo motor to another object is controlled so that torque more than preset torque may not be generated from the servo motor, by applying a torque limit to an output of a speed control loop, that is, a torque command value.

For example, in the case of a welding gun for spot welding that is driven by a servo motor, work is pinched with welding tips of an electrode section of the welding gun, is pressed as a predetermined pressure generated by the output torque of the servo motor, and is welded by applying electricity between the welding tips.

In this welding gun, a move command is given to the servo motor driving the welding gun, the command which makes the servo motor advance further in a pressing direction over pressing points. Then, even if the electrode tips come in contact with work and are stopped, a moving length by the move command remains. Therefore, the servo motor attempts to make the electrode tips advance, and hence, the torque command value outputted from the speed loop increases to attempt in an make the electrode tips advance further. Then, by applying a torque limitation to this torque command value, the work is pressed with this constant output being torque limited.

The above method has a problem in that the vibration of the applied force arises because an end of the welding gun becomes a spring. Another problem is that cycle time is delayed because it takes time for the pressure to become a preset applied force since it takes time for the torque command value for the servo motor to reach the torque limitation value. Furthermore, if the welding tips of the electrode section of the welding gun, that are driven by the servo motor move an, acceleration torque for this movement is lost from the output torque limited, and hence the applied force is lacking.

DISCLOSURE OF THE INVENTION

An object of the present invention is to provide a method for controlling force application with a servo motor for not only preventing the applied force from vibrating but also preventing the applied force from delaying, and for preventing the applied force from lacking, and an apparatus therewith.

In order to achieve the above object, a method for controlling force application with a servo motor, in which an applied force of a movable object driven by a servo motor to another object is controlled, according to the present invention includes a step of forming a force control loop with an applied force commanded to the servo motor and the applied force estimated by an observer; and a step of performing feedback control of the applied force.

In addition, preferably, the method further includes a step of detecting the speed of the movable object to perform the feedback control of speed, too.

In addition, an apparatus for controlling force application with a servo motor, according to the present invention, controls an applied force of a movable object, driven by the servo motor, to another object, and includes an observer estimating the applied force; and force control loop execution means for performing the force feedback control with an applied force commanded to the servo motor and the applied force estimated by the observer.

In addition, preferably, the apparatus further includes speed detection means detecting the speed of the movable object; and speed feedback control means performing the speed feedback control.

Since the present invention performs feedback control of the applied force by the movable object (welding tips) driven by the servo motor, the present invention can generate the applied force, which is targeted, with good response. Furthermore, the present invention can accelerate the cycle time of work. Moreover, the present invention can adjust the applied force lest vibration should arise in the applied force, by adjusting the gain of the force feedback control and the gain of the speed loop provided in the force loop. Hence, the present invention can constantly generate the applied force, which is targeted, without the vibration arising during force application.

BEST MODE FOR CARRYING OUT THE INVENTION

A control method of an applied force by a movable object, whose driving is controlled by a servo motor, according to the present invention will be described below by exemplifying a case when the movable object is composed of welding tips of a welding gun for spot welding that is driven and controlled by the servo motor.

Figure 1:
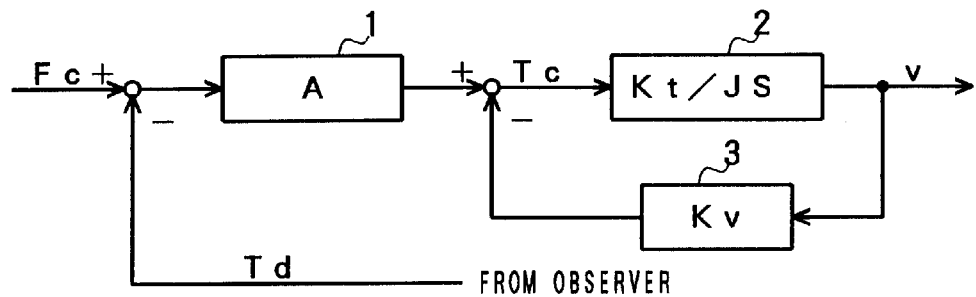
FIG. 1 is a block diagram showing a force control loop, which is constructed for a servo motor, for executing force application control by the servo motor according to the present invention.

FIG. 1 is a block diagram showing a force control loop which is constructed for a servo motor driving the welding tips for spot welding.

Figure 5:
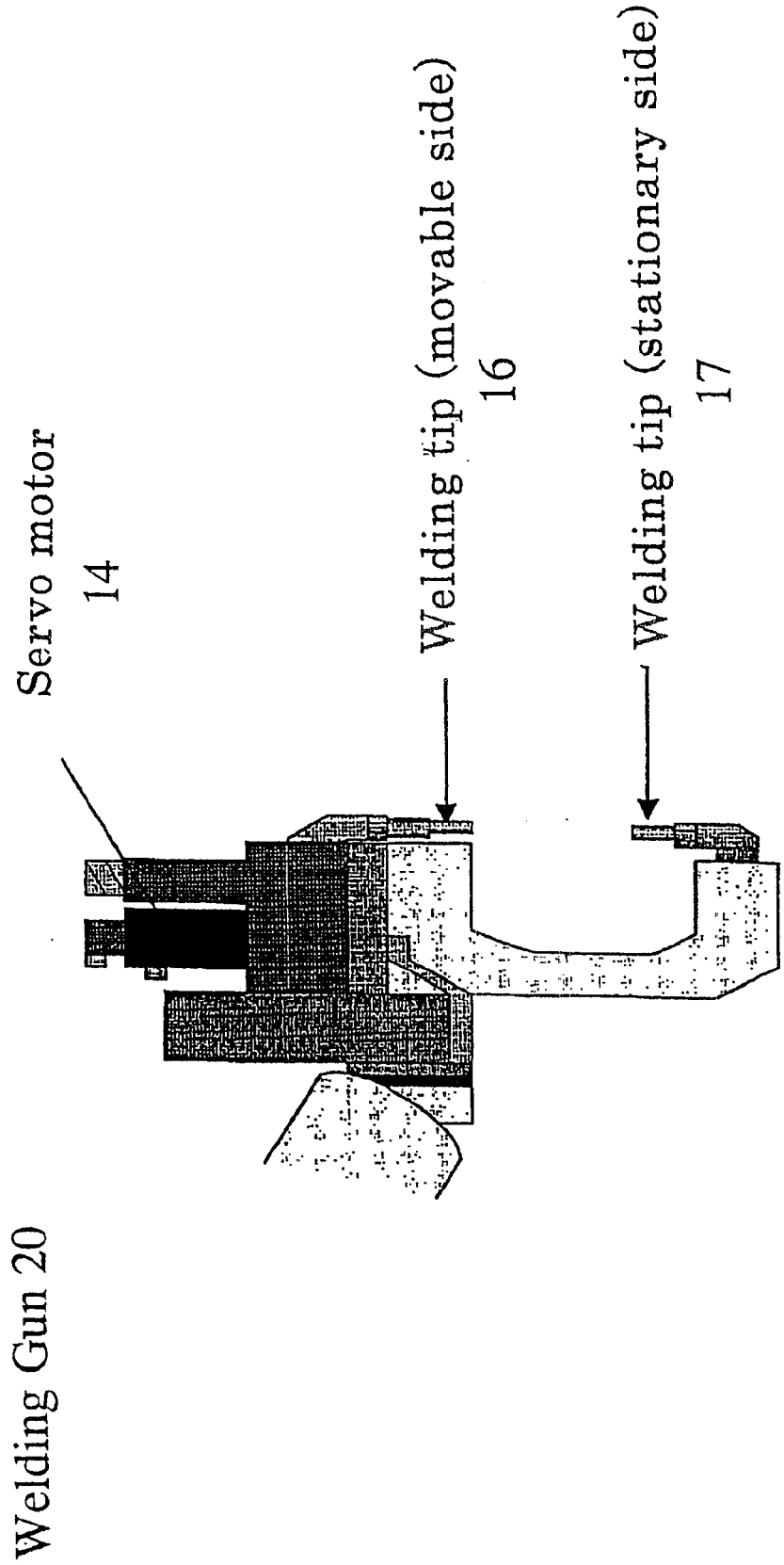
FIG. 5 is a diagram showing the servo motor and welding tips for embodiments of the present invention.

An embodiment of the servo motor 14 and welding tips 16 and 17 can be seen in FIG. 5, which illustrates a spot welding gun 20.

This block diagram includes: term 1 of a transfer function of a gain A for a force feedback control; term 2 of a transfer function of the servo motor; and term 3 of a transfer function of a speed loop gain Kv for speed feedback. In addition, symbol Kt in the term 2 represents a torque constant of the servo motor driving the welding tips of the welding gun, J corresponds to inertia, and S corresponds to a Laplace operator.

The driving and control of the servo motor (2) is performed by: subtracting an applied force Td, which is estimated by an observer that estimates disturbance applied to the servo motor, from a force application command Fc that is a target value of the applied force that the welding tips apply to an object to be welded; multiplying the subtracted value (Fc−Td) by the gain A; and obtaining a value (A*(Fc−Td)−v*Kv) as a torque command value Tc, by subtracting from the value (A*(Fc−Td)) a value (v*Kv) which is obtained by multiplying a speed feedback value v by the speed loop gain Kv.

Let a spring constant be K and let a damping constant be D, and the applied force Td estimated by the disturbance estimation observer can be expressed in the next equation (1):

$$Td = K*\theta + D*v = K*\theta + D*\theta S \tag{1}$$

where symbol θ is a moving length after contact of the welding tips to the object to be welded, and v is variation of the moving length with respect to time, that is, speed.

Then, from FIG. 1, we obtain:

$$\{A(Fc-Td)-Kv*v\}(Kt/JS) = v \tag{1'}$$

In equation (1'), from equation (1) and v=θS, we obtain:

$$\{A(Fc-(K*\theta+D*\theta S))]-Kv*\theta S\}(Kt/JS) = \theta S \tag{1''}$$

Solving equation (1") for Fc, we obtain:

$$Fc = (J/(A*Kt))\theta S^2 + [(Kv/A)+D]\theta S + K*\theta \tag{2}$$

From equations (1) and (2), a transfer function Td/Fc from the force application command Fc to the estimated applied force Td can be expressed as follows:

$$Td/Fc = (k+DS)/\{(J/(A*Kt))S^2 + [(Kv/A)+D]S+K\} \tag{3}$$

In equation (3), if S=0, that is, the speed becomes "0", we obtain:

$$Td/Fc = K/K = 1$$

Therefore, Td=Fc, and hence the target applied force can be obtained.

Then, the estimated disturbance detected by the disturbance estimation observer, that is, the estimated applied force is graphically displayed on a display screen of a display unit such as a teaching pendant of a robot where this welding gun is mounted. Furthermore, the gain Kv of the speed loop is adjusted so that the vibration of the estimated applied force may converge. Alternatively, the gain A of the force control loop is adjusted so that the vibration of the estimated applied force may converge.

Figure 4:
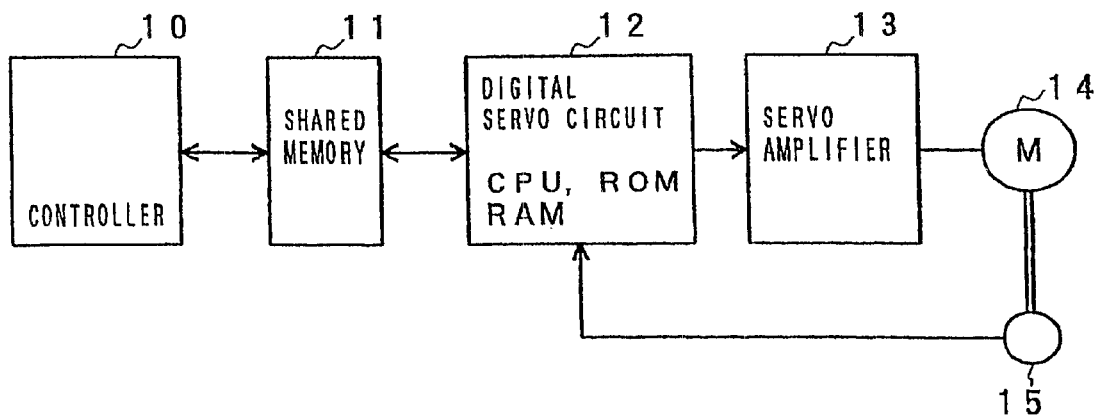
FIG. 4 is a block diagram showing the hardware of a control system executing the force application control shown in FIG. 1.

Hardware of a control system executing the force application control shown in FIG. 1 will be described with reference to a block diagram in FIG. 4.

The welding gun 20 also is controlled by a controller 10, such as a numerical controller controlling the robot where the welding gun 20 is mounted. FIG. 4 shows only a servo motor 14 driving the welding tips 16 and 17, as illustrated in FIG. 5, of the welding gun. The servo motor 14 shown in FIG. 4 is also illustrated in FIG. 5, with the same reference number.

Various control signals including a move command are outputted from the controller 10 to a digital servo circuit 12 through shared memory 11. The digital servo circuit 12 includes a processor, ROM, and RAM, digitally performs servo control of a position, speed, and the like, and further performs control of the force with which the welding tip presses the object to be welded.

On the basis of current commands for individual phases outputted from this digital servo circuit 12, the servo motor 14 driving the welding tips of the welding gun and servo motors of respective axes of the robot are driven and controlled respectively through a servo amplifier 13 composed of an inverter and the like. In addition, the position and speed of the servo motor 14 are detected by a detector 15 composed of a pulse coder, which is mounted on the motor shaft of the servo motor 14, and the like.

The feedback signals of the position and speed that are outputs of this detector 15 are fed back to the digital servo circuit 12. In addition, the servo control system itself that is shown in FIG. 4 is publicly known.

Next, an example of the disturbance estimation observer 6 used for estimating the force (applied force) with which the welding tips press the welded object will be described with reference to a block diagram in FIG. 3.

Figure 3:
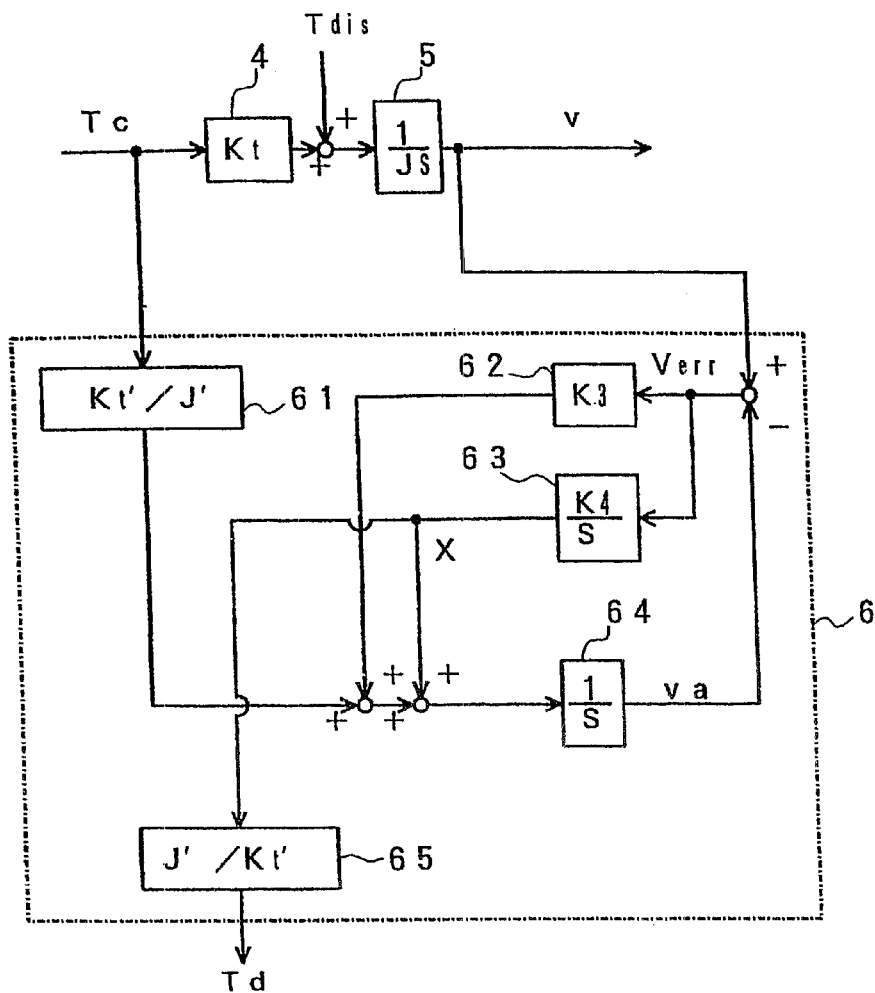
FIG. 3 is a block diagram showing a disturbance estimation observer used in the force application control shown in FIG. 1.

In FIG. 3, the term 2 of Kt/JS in FIG. 1 is divided into term 4 of Kt and term 5 of 1/JS.

The disturbance estimation observer 6 in this FIG. 3 estimates disturbance torque with the torque command Tc and speed v of the servo motor which are outputted from the speed loop and the like.

A symbol K3 in term 62 and K4 in term 63, which are included in the disturbance estimation observer 6, are respective parameters of the disturbance estimation observer 6. In addition, term Kt'/J' of term 61 is a value of a parameter to be multiplied by the current value Tc that is the torque command actually outputted to the servo motor, and is a value obtained by dividing a value Kt' of a nominal torque constant of the motor by a value J' of nominal inertia. Term 64 is an integral term and is a term for obtaining the estimated speed va of the motor by integrating a value obtained by totaling outputs of terms 61, 62, and 63.

Assuming Kt'/J' in the block diagram of FIG. 3 equals to Kt/J, we obtain:

$$(Tc*Kt+Tdis)(1/JS) = v \tag{4}$$

$$\{Tc*(Kt/J)+(v-va)K3+(v-va)(K4/S)\}/(1/S) = va \tag{5}$$

From equation (4), we obtain:

$$Tc = (v*JS-Tdis)/Kt \tag{6}$$

Substituting equation (6) into equation (5) and arranging the new equation (5), we obtain:

$$vS-(Tdis/J)+(v-va)*K3+(v-va)*K4/S = vaS \tag{7}$$

Therefore, term Tdis/J can be expressed as follows:

$$Tdis/J = S(v-va)+(v-va)*K3+(v-va)*(K4/S) \tag{8}$$

From equation (8), we obtain:

$$v-va = Verr = (Tdis/J)\{1/[S+K3+(K4/S)]\} \tag{9}$$

From equation (9), the integral value X that is an output of term 63 is expressed as follows:

$$X = Verr*(K4/S) = (Tdis/J)\{K4/[S^2+K3S+K4]\} \tag{10}$$

Then, in equation (10), if the parameters K3 and K4 are selected so that poles of the equation may become stable, it becomes possible to make approximation of X=Tdis/J. Therefore, by multiplying this integral value X (=Tdis/J) by the parameter J'/Kt' of term 65, the estimated disturbance torque Td (the estimated disturbance torque whose dimensions are met with those of the torque command Tc) is obtained.

In the state of the welding tips of the welding gun pressing the welded object, it is possible to assume that the applied force is equal to the estimated disturbance torque Td obtained from the disturbance estimation observer. In addition, the disturbance estimation observer shown in FIG. 3 is publicly known (for example, refer to Japanese Patent Application Laid-Open No. 7-110717), the applied force can be estimated with another form of disturbance estimation observer instead of this disturbance estimation observer.

Next, the processing that the processor of the digital servo circuit 12 performs with every position and speed loop processing cycle will be described with reference to the flow chart in FIG. 1.

The controller 10, according to a teaching program, outputs a move command with every distribution cycle to each axis of the robot, further outputs a move command for moving the welding gun mounted on a wrist of the robot to a weld position. Furthermore, the controller 10 outputs a move command for moving the welding tips move to the position where the welding tips press the welded object, thereafter, outputs a command for switching a control mode to force application control, and sets a flag F of the shared memory 11 to "1".

Then, the controller 10 that received a signal of weld completion from the welding gun outputs a command for switching a control mode from the force application control to normal position and speed control. Furthermore, the controller 10 sets the flag F to "0", and outputs the next move command. The controller 10 executes the above operation on the basis of the teaching program.

Figure 2:
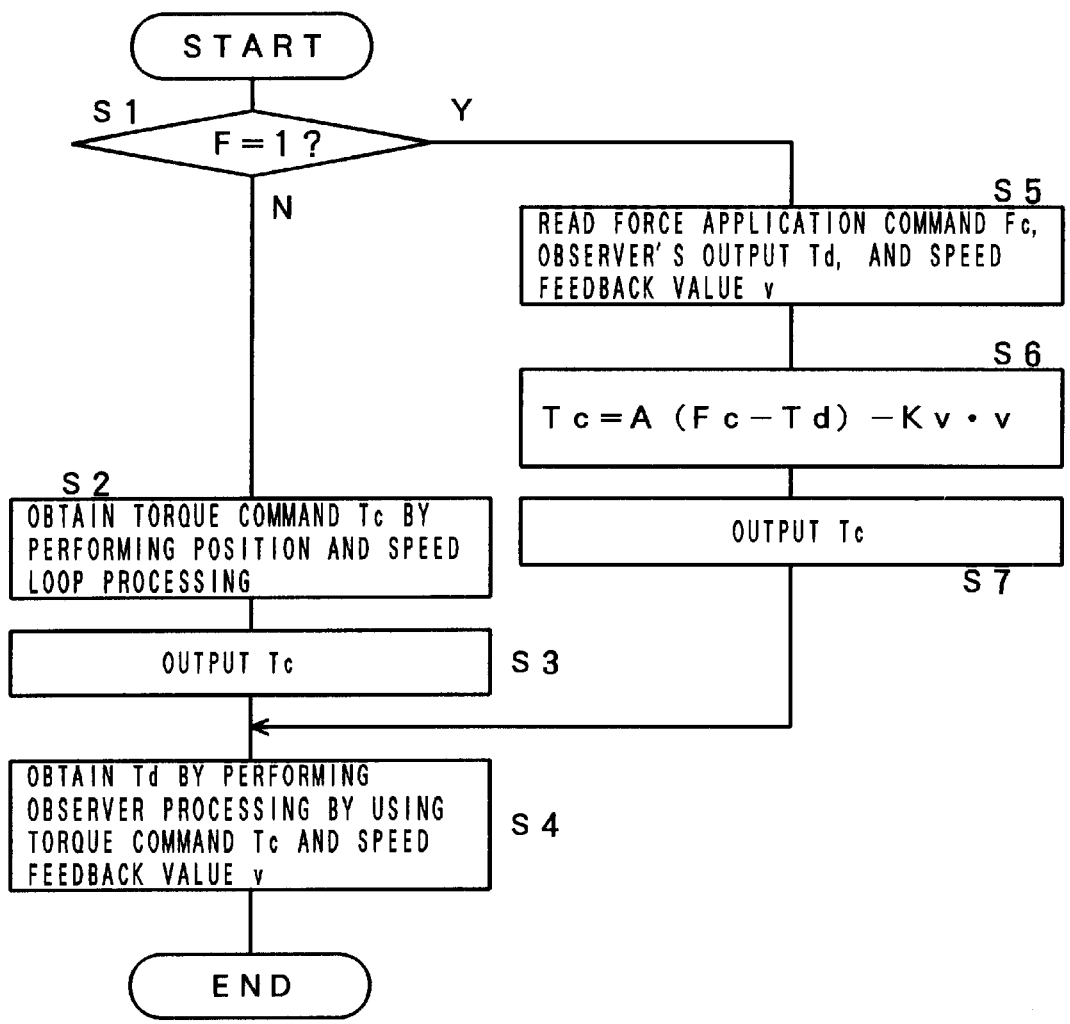
FIG. 2 is a flow chart showing the processing for performing the force application control, shown in FIG. 1, with every position and speed loop processing cycle.

On the other hand, the processor of the digital servo circuit 12 reads various commands, including the move command, from the shared memory 11, and executes the processing, shown in FIG. 2, with every position and speed loop processing cycle.

The processor of the digital servo circuit 12 judges whether the flag F of the shared memory 11 that commands the force application control is set to "1" (step S1). If the flag F is not set to "1", the processor, similarly to the conventional one, executes the position loop processing and speed loop processing on the basis of the move command value commanded and feedback values of the position and speed that are fed back from the position and speed detector 15, and obtains the torque command Tc (step S2).

In addition, the processor delivers the torque command Tc, which is obtained hereinabove, to current loop (step S3). In the current loop processing, the processor performs processing on the basis of this torque command Tc to obtain current commands for respective phases of the servo motor, and drives and controls the servo motors of respective axes through servo amplifiers such as inverters.

In addition, for at least the servo motors 14 driving the welding tips of the welding gun, the processor executes the processing by the observer that is shown in FIG. 3 (since this processing by the observer is publicly known, a flow chart of this processing is omitted), on the basis of the torque command Tc, which is obtained at step S2, and the speed feedback value. The processor then obtains the disturbance estimation torque Td and stores the torque in a register (step S4), and terminates the processing in the position and speed loop processing cycle. Hereinafter, until the flag F is set to "1" one by the controller 10 outputting the force application control command, the above processing is repeatedly executed.

On the other hand, if the flag F is set to "1" by the controller 10 outputting force application control command, the processor of the digital servo circuit 12 detects the fact that the flag F is set to "1" (step S1). Consequently, the processor reads force application command Fc, disturbance estimation torque Td of the servo motor 14 driving the welding tips, which is stored in the register, that is, the applied force estimated, and also reads speed feedback value v that is fed back from the position and speed detector 15 (step S5). Then, the processor obtains torque command Tc by executing the force control loop processing shown in FIG. 1 and the speed loop processing in the force control loop. Thus, the torque command value Tc is obtained with performing the following calculation (step S6):

$$Tc = A^*(Fc-Td) - Kv^*v \tag{11}$$

The processor delivers the torque command value Tc, which is obtained in this manner, to the current loop (step S7), and drives and controls the servo motor 14 for driving the welding tip through the servo amplifier 13. Then, the process goes to the step S4, where the processor obtains and stores the disturbance estimation torque (the estimated applied force) Td by executing the observer processing. Hereinafter, so long as the flag F is set to "1", the processor performs feedback control of the applied force by executing the processing at steps S1, S5–S7, and S4 with every position and speed loop processing cycle.

When the spot welding is completed and the weld completion signal is inputted from the welding gun to the controller 10, the controller 10 outputs the signal for switching a control mode from force application control to normal position and speed loop control.

And the controller 10 sets the flag F at "0", and hereafter, distributes the above-described move commands in a manner similar to the conventional one. The processor of the digital servo circuit 12 repeatedly executes the processing at the steps S1 through S4 with every position and speed loop processing cycle.

In addition, in the force control loop, in a steady state, the speed feedback value v becomes "0". In a state where there is a small deviation (steady-state deviation) between the force application command Fc and the estimated applied force Td, the value obtained by multiplying a steady-state deviation by the gain A becomes the torque command value Tc, and hence, the state becomes steady. In order to eliminate this steady-state deviation, it may be also performed to add the estimated applied force Td, estimated by the disturbance estimation observer 6, to the torque command Tc and make the added torque command a command to the servo motor. Thus, in FIG. 1, it may be performed to subtract the output of term 3 (the product of the speed feedback value and gain Kv) from the output of term 1 (the product of the deviation between forces and the gain A), add the estimated applied force Td to the remainder, and make the sum the torque command to the servo motor (2). In this case, even if the deviation between forces becomes "0" since Fc=Td, the estimated applied force Td is given as the torque command. Therefore, the estimated applied force Td is controlled to coincide with the force application command Fc.

In addition, processing in this case can be performed by adding the estimated applied force Td to equation (11) for obtaining the torque command Tc at step S6 in FIG. 2, as follows:

$$Tc = A^*(Fc-Td) - Kv^*v + Td$$

What is claimed is:

1. A method for controlling force application with a servo motor, by controlling an applied force of welding tips of a welding gun, driven by the servo motor, to an object to be welded, comprising:

forming a force control loop with an applied force commanded to the servo motor, a torque command outputted to the servo motor, and an applied force estimated by an observer unit;

performing feedback control of the applied force; and controlling vibration of the welding tips by adjusting a gain of the feedback control.

2. A method for controlling force application with a servo motor according to claim 1, further comprising:

displaying the estimated applied-force.

3. An apparatus for controlling force application with a servo motor, that controls an applied force of welding tips of a welding gun, driven by the servo motor, to an object to be welded, comprising:

an observer unit estimating the applied force; and a force control loop processing execution means for performing force feedback control with an applied force commanded to the servo motor, a torque command outputted to the servo motor, and the applied force estimated by the observer unit, and for adjusting a gain of the force feedback control to control vibration of the welding tips.

4. An apparatus for controlling force application with a servo motor according to claim 3, further comprising:

a speed detection means for detecting the speed of the welding tips.

5. An apparatus for controlling force application with a servo motor, comprising:

a controller outputting a force control command of an applied force of welding tips of a welding gun, driven by a servo motor, to an object to be welded;

applied-force estimation means for estimating an applied force produced when a movable object is driven by the servo motor and pressed to another object in accordance with a force application control command from the controller;

speed detection means for detecting an actual speed of the servo motor; and torque command means for calculating a torque command Tc outputted to the servo motor with using the following equation:

$$Tc = A^*(Fc-Td) - Kv^*v$$

and outputting the torque command to the servo motor, where A and Kv are coefficients, Fc is the force application control command outputted from the controller, Td is the applied force estimated in the applied-force estimation means, and v is the speed of the servo motor detected by the speed detection means.

6. An apparatus for controlling force application with a servo motor according to claim 5, wherein the torque command means calculates the torque command Tc outputted to the servo motor by using the following equation, instead of using the equation of Tc in claim 5:

$$Tc = A^*(Fc-Td) - Kv^*v + Td$$

and outputs the torque command Tc to the servo motor.

7. An apparatus for controlling force application with a servo motor according to claim 5, wherein a value of an applied force Td that the torque command means uses for calculation of the torque command Tc is a value that the applied force estimation means calculates from a torque command Tc, which was outputted in the preceding cycle, and speed v, which the speed detection means outputted at the time of the torque command being outputted.

8. An apparatus to control force application with a servo motor according to claim 6, wherein a value of an applied force Td that the torque command means uses for calculation of the torque command Tc is a value that the applied force estimation means calculates from a torque command Tc, which was outputted in the preceding cycle, and speed v, which the speed detection means outputted at the time of the torque command being outputted.

9. A method for controlling force application with a servo motor, by controlling an applied force of welding tips of a welding gun, driven by the servo motor, to an object to be welded, comprising:

forming a force control loop with an applied force commanded to the servo motor, a torque command outputted to the servo motor, and an applied force estimated by an observer unit;

performing feedback control of the applied force; and adjusting a gain of amplification of a deviation between a force application command in the force control loop and the estimated applied-force to control vibration of the welding tips.

10. A method for controlling force application with a servo motor according to claim 9, further comprising:

displaying the estimated applied-force.

11. An apparatus to control an applied force of welding tips of a welding gun, driven by a servo motor, to an object to be welded, comprising:

an observer unit to estimate the applied force;

a force feedback control loop based on an applied force commanded to a servo motor, a torque command outputted to the servo motor, and the applied force estimated by the observer unit; and a speed feedback control loop based on a difference between a speed of a movable object and a difference between the applied force commanded and the applied force estimated, wherein a gain of the speed feedback control is adjusted to control vibration of the welding tips.

12. An apparatus for controlling force application with a servo motor, that controls an applied force of welding tips of a welding gun, driven by the servo motor, to an object to be welded, comprising:

an observer unit estimating the applied force; and a force control loop processing execution means for performing force feedback control with an applied force commanded to the servo motor, a torque command outputted to the servo motor, and the applied force estimated by the observer unit, and for adjusting a gain of amplification of a deviation between a force application command in the force control loop and the estimated applied-force to control vibration of the welding tips.

13. An apparatus for controlling force application with a servo motor according to claim 12, further comprising:

a speed detection means for detecting the speed of the welding tips.

14. An apparatus to control an applied force of welding tips of a welding gun, driven by a servo motor, to an object to be welded, comprising:

an observer unit to estimate the applied force;

a force feedback control loop based on an applied force commanded to a servo motor, a torque command outputted to the servo motor, and the applied force estimated by the observer unit; and a speed feedback control loop based on a difference between a speed of a movable object and a difference between the applied force commanded and the applied force estimated, wherein a gain of amplification of a deviation between a force application command in the force feedback control loop and the estimated applied-force is adjusted to control vibration of the welding tips.

* * * * *

UNITED STATES PATENT AND TRADEMARK OFFICE
CERTIFICATE OF CORRECTION

PATENT NO. : 6,486,629 B2  Page 1 of 1
DATED : November 26, 2002
INVENTOR(S) : Tetsuaki Kato et al.

It is certified that error appears in the above-identified patent and that said Letters Patent is hereby corrected as shown below:

Title page,
Item [57], ABSTRACT,
Line 3, change "Fe" to -- Fc --.

Column 1,
Line 24, change "as" to -- at --.
Line 35, change "to" to -- in an -- and change "in an" to -- to --.
Line 47, after "motor" insert -- , -- and change "an," to -- an --.

Column 3,
Line 62, after "gun" insert -- 20 --.

Signed and Sealed this

Seventeenth Day of June, 2003

JAMES E. ROGAN
*Director of the United States Patent and Trademark Office*